(12) United States Patent
Cai et al.

(10) Patent No.: US 8,129,483 B2
(45) Date of Patent: Mar. 6, 2012

(54) CIRCULATING FLUIDIZED BED REACTOR

(75) Inventors: Ping Cai, Lake Jackson, TX (US); F. David Hussein, Cross Lanes, WV (US); Ian D. Burdett, Charleston, WV (US); David M. Gaines, St. Albans, WV (US); Roger B. Painter, Rosharon, TX (US)

(73) Assignee: Univation Technologies, LLC, Houston, TX (US)

( * ) Notice: Subject to any disclaimer, the term of this patent is extended or adjusted under 35 U.S.C. 154(b) by 0 days.

(21) Appl. No.: 13/119,532

(22) PCT Filed: Oct. 8, 2009

(86) PCT No.: PCT/US2009/059988
§ 371 (c)(1),
(2), (4) Date: Apr. 13, 2011

(87) PCT Pub. No.: WO2010/045091
PCT Pub. Date: Apr. 22, 2010

(65) Prior Publication Data
US 2011/0184131 A1 Jul. 28, 2011

Related U.S. Application Data

(60) Provisional application No. 61/196,325, filed on Oct. 15, 2008.

(51) Int. Cl.
*C08F 2/34* (2006.01)
*B01J 19/24* (2006.01)
*C08F 210/02* (2006.01)

(52) U.S. Cl. .......... 526/64; 526/88; 526/918; 422/132

(58) Field of Classification Search .............. 526/64, 526/88, 918; 422/132
See application file for complete search history.

(56) References Cited

U.S. PATENT DOCUMENTS

| 3,709,853 | A | 1/1973 | Karapinka |
| 4,003,712 | A | 1/1977 | Miller |
| 4,011,382 | A | 3/1977 | Levine et al. |
| 4,302,566 | A | 11/1981 | Karol et al. |
| 4,543,399 | A | 9/1985 | Jenkins, III et al. |
| 4,882,400 | A | 11/1989 | Dumain et al. |

(Continued)

FOREIGN PATENT DOCUMENTS

EP 1720913 3/2009

(Continued)

OTHER PUBLICATIONS

Cai, P. and Burdett, I.D., "Polymerization Simulation Under Different Fluidization Regimes," Circulating Fluidized Bed Technology VIII, ed. By K. Cen, p. 410-417, International Academic Publishers (2005).

*Primary Examiner* — Fred M Teskin

(57) ABSTRACT

A continuous gas phase circulating bed reactor, including: a riser for contacting a catalyst and a first gas composition comprising an olefin to form a polyolefin under fast-fluidization regime or a dilute-phase pneumatic conveying regime conditions; a downer for contacting the catalyst and a second gas composition comprising an olefin to form additional polyolefin under fast fluidization regime or a dilute-phase pneumatic conveying regime conditions; and a transport section for conveying at least a portion of the catalyst, polyolefin, and additional polyolefin from the downer to the riser. Also disclosed is a polymerization process using such a circulating bed reactor.

19 Claims, 4 Drawing Sheets

U.S. PATENT DOCUMENTS

| | | |
|---|---|---|
| 5,352,749 A | 10/1994 | DeChellis et al. |
| 5,541,270 A | 7/1996 | Chinh et al. |
| 5,698,642 A | 12/1997 | Govoni et al. |
| 5,942,194 A | 8/1999 | Hummel et al. |
| 6,818,187 B2 | 11/2004 | Govoni et al. |
| 7,122,607 B2 | 10/2006 | Hagerty et al. |
| 7,300,987 B2 | 11/2007 | Hagerty et al. |
| 2008/0145309 A1 | 6/2008 | Bavarian et al. |

FOREIGN PATENT DOCUMENTS

| | | |
|---|---|---|
| FR | 1302168 A | 8/1962 |
| WO | WO 2006/022736 | 3/2006 |
| WO | WO 2006/067052 A1 * | 6/2006 |
| WO | WO 2009/131663 A2 | 10/2009 |
| WO | WO 2009/147226 | 12/2009 |

* cited by examiner

CIRCULATING FLUIDIZED BED REACTOR

CROSS REFERENCE TO RELATED APPLICATIONS

This application is a National Stage application under 35 U.S.C. §371 of International Application No. PCT/US2009/059988, filed Oct. 8, 2009, that claims the benefit of U.S. Provisional Application Ser. No. 61/196,325, filed Oct. 15, 2008, the disclosures of which are incorporated by reference in their entireties.

FIELD OF THE INVENTION

Embodiments disclosed herein relate generally to a gas-phase polymerization reactor and continuous polymerization processes using the gas-phase polymerization reactor. More specifically, embodiments disclosed herein relate to a circulating fluidized bed reactor capable of forming a diverse range of polyolefin products, including unimodal, bimodal, multi-modal, as well as narrow and broad molecular weight distribution polymers.

BACKGROUND

It is well known that many polymers can be produced as powders in fluid bed reactors where the fluidization of the polymeric solids is provided by a circulating mixture of gases including one or more monomers. For example, vapor phase polymerization is a common process, widely used for the production of polyolefins, such as polyethylene, polypropylene, and polyolefin copolymers. One particularly arrangement of a fluid bed polyolefin process is disclosed in U.S. Pat. No. 4,882,400. Other examples of fluid bed polyolefin technology are described in, for example, U.S. Pat. Nos. 3,709,853; 4,003,712; 4,011,382; 4,302,566; 4,543,399; 4,882,400; 5,352,749; 5,541,270; 7,122,607, and 7,300,987. These patents disclose gas-phase polymerization processes wherein the polymerization medium is either mechanically agitated or fluidized by the continuous flow of gaseous monomer and diluent.

The "traditional" gas-phase fluidized-bed reactors described in many of the patents listed above is a simple and cost-competitive device useful for the manufacture of polyolefins. However, many desired polyolefin products are difficult to produce in such gas-phase reactors due to the well-mixed CSTR nature of the reactors, including bimodal and multimodal products or products having broad molecular weight distributions and other advanced products. Such products typically require the use of specialized catalysts, such as dual site or bimodal catalysts or the use of multiple reactors in series.

One attempt to overcome the deficiencies in a traditional gas-phase reactor is described in U.S. Pat. No. 5,698,642 disclosing a multi-zone circulating reactor (MZCR) in which there is a up-flowing riser section operating in a dilute-phase fast fluidization regime and a down-flowing dense-phase moving-bed section. The gas compositions in those two sections are set differently to achieve the product differentiation.

WO 2006/022736 discloses a reactor system composing a plurality of MZCRs connected in fluid communication, and describes different types of operation for the different reactor zones.

With respect to the MZCR, the dense phase down-flowing moving bed may be agglomeration prone and may cause significant problem in reactor operation. Pre-polymerization is required for the MZCR, although it can not solve all the agglomeration-related reactor-operation problems. For example, see P. Cai, I. D. Burdett, "Polymerization Simulation Under Different Fluidization Regimes," Circulating Fluidized Bed Technology VIII, ed. by K. Cen, p. 410-417, International Academic Publishers (2005). In addition, it is very difficult to control the temperature uniformity in the down-flowing moving bed, which in turn can result in a negative impact on product property control.

Efforts have been reported to improve the operation of MZCR, such as adding liquid to the multiple locations in the down-flowing moving bed (e.g., EP 1,720,913). However, the non-fluidized dense-phase nature of the down-flowing moving-bed section of the MZCR does not allow a significant process improvement.

Another limitation of the MZCR is that the gas compositions in the two reactor sections can not be too far apart (e.g., any component absolutely undesired in the riser can not be fed into the downcorner), which limits the product capability. The production rate in the downcorner section is also limited because of the need to prevent particle melting by the reaction heat, which in turn limits the composition flexibility of bimodal or multimodal products.

Accordingly, there exists a need in the art for gas-phase reactors capable of producing a broad range of products without the need for specialized catalysts or multiple reactors.

SUMMARY

In one aspect, embodiments disclosed herein relate to a continuous gas phase circulating bed reactor, including: a riser for contacting a catalyst and a first gas composition including an olefin to form a polyolefin under fast-fluidization regime or a dilute-phase pneumatic conveying regime conditions; a downer for contacting the catalyst and a second gas composition including an olefin to form additional polyolefin under fast fluidization regime or a dilute-phase pneumatic conveying regime conditions; and a transport section for conveying at least a portion of the catalyst, polyolefin, and additional polyolefin from the downer to the riser.

In another aspect, embodiments disclosed herein relate to a process for the polymerization of olefins. The process may include: contacting in a riser a catalyst and a first gas composition including an olefin to form a polyolefin, wherein the contacting in the riser is under fast fluidization regime or dilute-phase pneumatic conveying regime conditions; contacting in a downer the catalyst and a second gas composition including an olefin to form additional polyolefin, wherein the contacting in the downer is under fast fluidization regime or dilute-phase pneumatic conveying regime conditions; and conveying at least a portion of the catalyst, polyolefin, and additional polyolefin from the downer to the riser.

DETAILED DESCRIPTION

Figure 1:
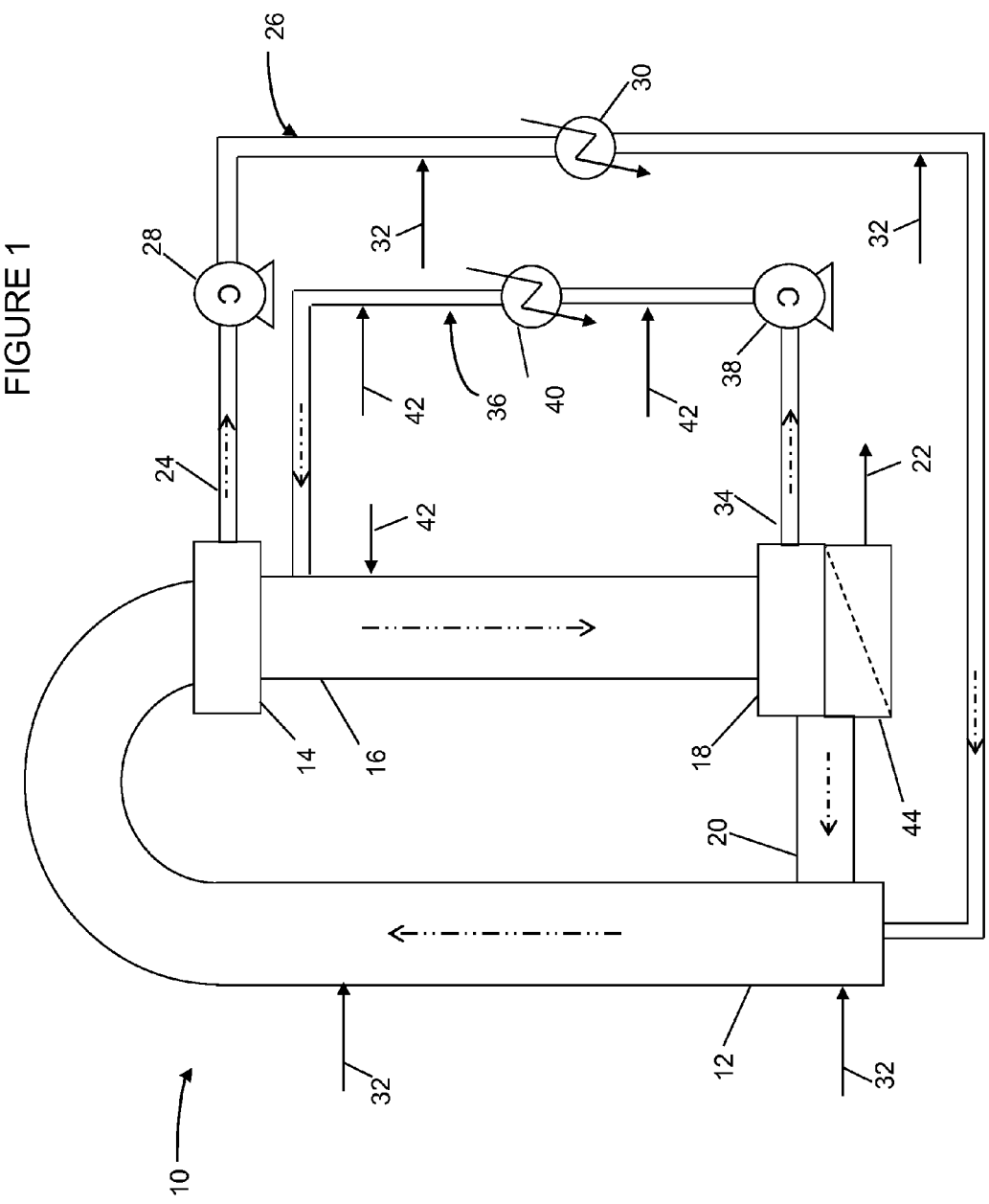
FIG. 1 is a simplified flow diagram of a gas-phase polymerization process according to embodiments disclosed herein.

Before the present compounds, components, compositions, devices, softwares, hardwares, equipments, configurations, schematics, systems, and/or methods are disclosed and described, it is to be understood that unless otherwise indicated this invention is not limited to specific compounds, components, compositions, devices, softwares, hardwares, equipments, configurations, schematics, systems, methods, or the like, as such may vary, unless otherwise specified. It is also to be understood that the terminology used herein is for the purpose of describing particular embodiments only and is not intended to be limiting.

It must also be noted that, as used in the specification and the appended claims, the singular forms "a," "an" and "the" include plural referents unless otherwise specified.

Embodiments disclosed herein relate generally to a gas-phase polymerization reactor and continuous polymerization processes using a gas-phase polymerization reactor. More specifically, embodiments disclosed herein relate to a circulating fluidized bed reactor capable of forming a diverse range of polyolefin products, including unimodal, bimodal, multimodal, as well as narrow and broad molecular weight distribution polymers. Other embodiments disclosed herein relate to a process for producing polyolefins and polyolefin copolymers in the circulating fluidized bed reactor.

Circulating fluidized bed reactors disclosed herein may include a riser for contacting a catalyst and a first gas composition including an olefin as a fast-fluidized bed to form a polyolefin. The solids from the riser, including the catalyst and the polyolefin formed may then be fed to a downer for contacting the catalyst and a second gas composition comprising an olefin as a fast-fluidized bed to form additional polyolefin. A portion of the resulting solids may be recovered as a polymer product, and at least a portion of the resulting solids may be recirculated through the riser and downer to form additional polymer. Recirculation of the catalyst allows for the catalyst to travel through the riser/downer circulation loop over multiple periods of gas contact, allowing for efficient catalyst use and formation of "mature" polymer particles.

The use of a riser and a downer, each having independently controlled gas compositions, may allow for the production of unimodal polymers, such as where the first gas composition and the second gas composition are similar, multimodal polymers, such as where the first and second gas compositions differ to the desired extent. Additionally, intimate mixtures of polymers, well mixed at the intra-particle level, may be formed by varying the gas compositions to the desired extent. Circulating fluidized bed reactors disclosed herein may thus produce a wide variety of polymers via manipulation of reactor conditions and gas compositions (i.e., in the riser and downer), and may allow for production of polymers heretofore only realizable when using a bimetallic or other specialty catalyst, and/or using multiple reactors in series.

One embodiment of a circulating fluidized bed reactor for use in the polymerization processes disclosed herein is illustrated in FIG. 1. The circulating fluidized bed reactor 10 includes a riser 12 for contacting a polymerization catalyst and a first gas composition comprising an olefin as a fast-fluidized bed (i.e., operating in the fast fluidization regime) to form a polyolefin. In other embodiments, riser 12 may be operated such that the first gas composition and the solids circulate in the dilute-phase pneumatic conveying flow regime.

The solids resulting due to polymerization in riser 12, including the catalyst and the polyolefin formed, may then be separated from the first gas composition in a first gas/solids separator 14. First gas/solids separator 14 may include an inertial separator (such as a settling chamber, baffle chamber, centrifugal collector, cyclone, ballistic/impingement separation devices, etc.), filters (such as fabric filters, hard porous-medium filters, jet pulsed filters, etc.), other apparatus for the continuous and semi-continuous separation of solid-gas mixtures, and combinations thereof. Examples of a gas/solid separator useful in embodiments disclosed herein is disclosed in U.S. Pat. Nos. 5,391,289, and 4,066,533, among others.

The solids recovered from the first gas/solids separator 14 may then be contacted with a second gas composition comprising an olefin as a fast-fluidized bed to form additional polyolefin in downer 16. In some embodiments, downer 16 is operated in the fast fluidization regime. In other embodiments, downer 16 may be operated such that the second gas composition and the solids contact under the dilute phase pneumatic conveying flow regime.

The solids resulting due to polymerization in downer 16, including the catalyst and the polyolefin formed, may then be separated from the second gas composition in a second gas/solids separator 18. Second gas/solids separator 18 may include an inertial separator (such as a settling chamber, baffle chamber, centrifugal collector, cyclone, ballistic/impingement separation devices, etc.), filters (such as fabric filters, hard porous-medium filters, jet pulsed filters, etc.), other apparatus for the continuous and semi-continuous separation of solid-gas mixtures, and combinations thereof. Examples of other gas/solid separators useful in embodiments disclosed herein may include those disclosed in R. J. Gartside, "QC—A New Reaction System," in *Fluidization VI, Proceedings of the International Conference on Fluidization*, ed. by J. R. Grace et al., p. 32 (1989), and Y. Jin et al., "Novel Configurations and Variants," in *Circulating Fluidized Beds*, Blackie Academic & Professional, London, p. 545, 1997.

At least a portion of the solids recovered in gas/solids separator 18 may be fed via transport section 20 to be recirculated through the riser and downer, allowing for multiple gas contact cycles, as described above. The remaining solids may be recovered via reactor outlet 22 as the product.

The first gas composition may be recovered from the first gas/solids separator via flow line 24, forming an initial portion of a gas circulation loop 26 for circulating the first gas composition back to the inlet of riser 12. The circulation path of the first gas composition within riser 12 and the gas circulation loop 26 is illustrated by dashed arrows. Compressor 28 may provide for circulation of the first gas composition, maintaining a sufficient gas velocity to maintain riser 12 as operating in the fast fluidized regime or the dilute phase pneumatic flow regime.

A heat exchange device 30, located along gas circulation loop 26 may be used to maintain the desired reaction temperature within riser 12. Alternatively or in addition to heat exchange device 30, a heat exchange device (not illustrated) may be provided to remove heat via indirect heat exchange with riser 12, such as a cooling jacket. Additionally, one or more inlets 32 may be provided for introduction of catalyst(s), co-catalysts, monomer(s), comonomer(s), inert gas(es), activator(s), polymerization modifier(s), antistatic agent(s), chain terminating agent(s) (such as hydrogen), and other compounds commonly used in the polymerization of olefins. Inlets 32, which may be located at any point along circulation loop 26 or riser 12, provide for the make-up of catalysts, reactants, and other components removed along with the polymer, allowing control of the first gas composition and the resulting polymerization occurring in riser 12.

Similarly, the second gas composition may be recovered from the second gas/solids separator via flow line 34, forming an initial portion of a gas circulation loop 36 for circulating the second gas composition back to the inlet of downer 16.

The circulation path of the second gas composition within downer 16 and the gas circulation loop 36 is also illustrated by dashed arrows. Compressor 38 may provide for circulation of the second gas composition, maintaining a sufficient gas velocity to maintain downer 16 as operating in the fast fluidized regime or the dilute phase pneumatic flow regime.

A heat exchange device 40, located along gas circulation loop 36 may be used to maintain the desired reaction temperature within downer 16. Alternatively or in addition to heat exchange device 40, a heat exchange device (not illustrated) may be provided to remove heat via indirect heat exchange with downer 16, such as a cooling jacket. Additionally, one or more inlets 42 may be provided for introduction of catalyst(s), co-catalysts, monomer(s), comonomer(s), inert gas(es), activator(s), polymerization modifier(s), antistatic agent(s), chain terminating agent(s) (such as hydrogen), and other compounds commonly used in the polymerization of olefins. Inlets 42, which may be located at any point along circulation loop 36 or downer 16, provide for the make-up of catalysts, reactants, and other components removed along with the polymer, allowing control of the second gas composition and the resulting polymerization occurring in downer 16.

In some embodiments, it may be desired to separate the solids recovered from the second gas/solids separator 18, or collected from any part of the reactor loop, so as to recover at least a portion of the relatively larger polymer particles from the circulating solids stream as the polymer product and to circulate the remaining particles back through the loop, including riser 12 and downer 16. Recovering the larger, more "mature," particles, on average, as product minimizes fresh catalyst bypass, resulting in higher catalyst productivity and performance.

Figure 2:
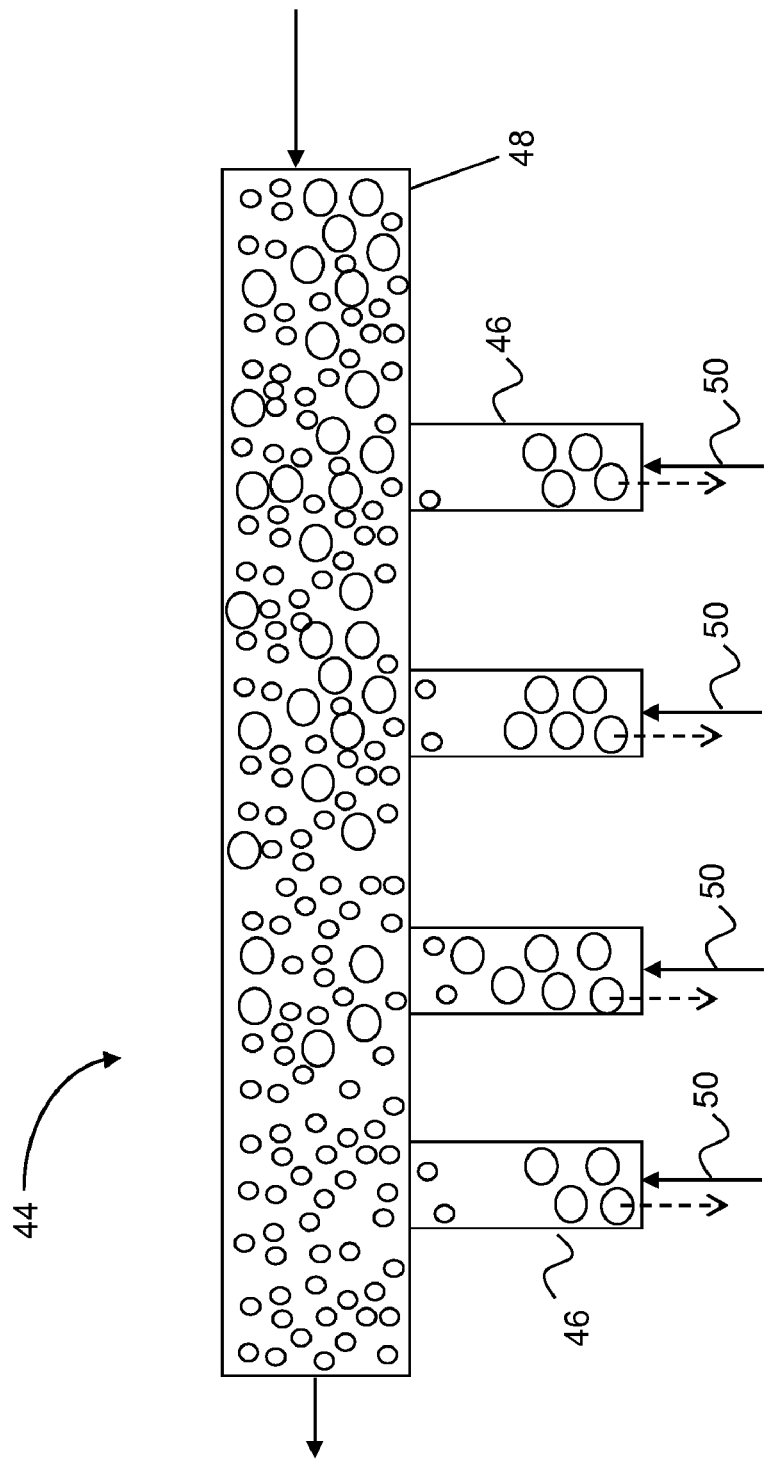
FIG. 2 is a schematic drawing of a particle segregator useful in embodiments disclosed herein.

Separation of the polymer particles may be achieved using a particle segregator 44, for example. Particle segregator 44, a detailed view of which is illustrated in FIG. 2, may include one or more vertical conduits 46 disposed along a horizontal conduit 48. A mixture of large particles and small particles is flowing from right to left in horizontal conduit 48, as illustrated. An upward gas flow 50 is introduced via conduits 46, creating a local gas velocity higher than the terminal velocity of the relatively small particles that are not desired to be withdrawn from the reactor, thereby allowing only larger solid particles to drop through vertical conduits 46 for collection. The smaller particles, unable to fall against the upward gas flow, remain in horizontal conduit 48 for forwarding to riser 12.

Figure 3:
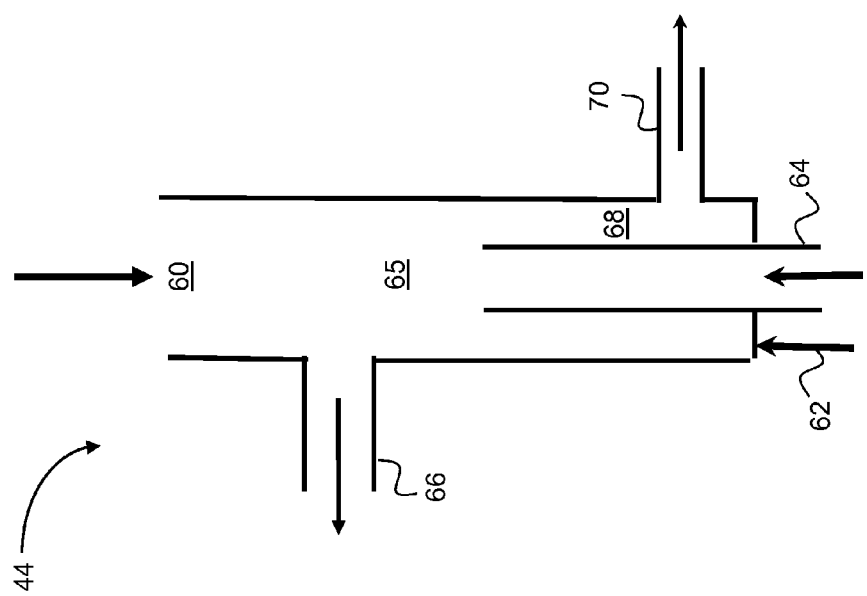
FIG. 3 is a schematic drawing of a particle segregator useful in embodiments disclosed herein.

Another embodiment of a segregator 44 is shown in FIG. 3. Particles from the downer (not shown) following gas/solid separations may flow into a top region 60 of segregator 44. Gas, introduced via inlets 62, 64, may flow into fluidization/settling region 65 at a velocity higher than the terminal velocity of small particles, separating the small particles from larger particles. The small particles may be carried with the gas via outlet 66 and recycled to the bottom of the riser (not shown). The large particles may fall into annular zone 68, which is fluidized by the gas flow 62 to form a dense-phase fluidization zone containing relatively large particles, fallen from region 65, that may be discharged via outlet 70. Because of the relatively dense status of annular zone 8, the product discharge via outlet 70 has a relatively high discharge efficiency (i.e., a relatively small amount of gas is discharged together with the solid products). In addition to being installed at the bottom of the downer, the segregation device shown in FIGS. 2 and 3 may also be installed in other places of the reactor. Other similar devices may also be used to segregate larger, mature, particles from the smaller particles.

Segregators as shown in FIGS. 2 and 3 may be used to discharge a polymer product from the reactor system, where the polymer product has an average particle size greater than an average particle size of the particles circulating through the riser and the downer.

As described above, gas-phase circulating fluidized bed reactors according to embodiments disclosed herein may be useful for the polymerization of various monomers and comonomers. Additionally, polymerization catalysts, co-catalysts, activators, solvents, and other polymerization modifiers or aids may be used for polymerization processes conducted in such a circulating gas-phase fluidized bed reactors described herein. Each of these will be discussed in more detail below.

Processes and apparatus disclosed herein may be useful, for example for the gas-phase polymerization of one or more olefin monomers having from 2 to 30 carbon atoms; olefins having from 2 to 12 carbon atoms in other embodiments; and olefins having from 2 to 8 carbon atoms in yet other embodiments. The gas phase reactor and processes disclosed herein are particularly suited to the polymerization of one or more olefin monomers, such as ethylene, propylene, butene-1, pentene-1, 4-methyl-pentene-1, 3-methyl-pentene-1, hexene-1, octene-1,3,5,5-tri-methyl-hexene-1, and decene-1.

Other monomers that may be useful in various embodiments disclosed herein may include ethylenically unsaturated monomers, diolefins having 4 to 18 carbon atoms, conjugated or non-conjugated dienes, polyenes, vinyl monomers, and cyclic olefins. Non-limiting examples of such monomers may include norbornene, norbornadiene, isobutylene, isoprene, vinylbenzocyclobutane, styrenes, alkyl substituted styrene, ethylidene norbornene, dicyclopentadiene, and cyclopentene. For example, co-monomers may include those dienes disclosed in U.S. Pat. No. 5,317,036, such as hexadiene, dicyclopentadiene, norbornadiene, and ethylidene norbornene; and readily condensable monomers such as those disclosed in U.S. Pat. No. 5,453,471 including isoprene, styrene, butadiene, isobutylene, and chloroprene, acrylonitrile, and the like.

In a family of embodiments, ethylene-based polymers may be prepared by processes disclosed herein. Such ethylene-based polymers may include homopolymers of ethylene and interpolymers of ethylene and at least one alpha-olefin wherein the ethylene content is at least about 50% by weight of the total monomers involved. Comonomers that may be used may include propylene, 1-butene, 1-pentene, 1-hexene, 1-heptene, 1-octene, 4-methylpentene-1, 1-decene, 1-dodecene, 1-hexadecene and the like. Also usable are polyenes such as 1,3-hexadiene, 1,4-hexadiene, cyclopentadiene, dicyclopentadiene, 4-vinylcyclohexene-1, 1,5-cyclooctadiene, 5-vinylidene-2-norbornene and 5-vinyl-2-norbornene, and olefins formed in situ in the polymerization medium. When olefins are formed in situ in the polymerization medium, the formation of polyolefins containing long chain branching may occur. In one embodiment, the content of the alpha-olefin comonomer incorporated into an ethylene-based polymer may be no greater than 49 mol % in total; from 3 to 35 mol % in other embodiments.

In another family of embodiments, propylene-based polymers may be prepared by processes disclosed herein. Such propylene-based polymers may include homopolymers of propylene and interpolymers of propylene and at least one alpha-olefin wherein the propylene content is at least about 50% by weight of the total monomers involved. Comonomers that may be used may include ethylene, 1-butene, 1-pentene, 1-hexene, 1-heptene, 1-octene, 4-methylpentene-1, 1-decene, 1-dodecene, 1-hexadecene and the like. Also usable are polyenes such as 1,3-hexadiene, 1,4-hexadiene, cyclopentadiene, dicyclopentadiene, 4-vinylcyclohexene-1, 1,5-cyclooctadiene, 5-vinylidene-2-norbornene and 5-vinyl-2-norbornene, and olefins formed in situ in the polymerization medium. When olefins are formed in situ in the polymerization medium, the formation of polyolefins containing long chain branching may occur. In one embodiment, the content of the alpha-olefin comonomer incorporated into a propylene-based polymer may be no greater than 49 mol % in total; from 3 to 35 mol % in other embodiments.

Any type of polymerization catalyst may be used in the present processes, including liquid-form catalysts, solid catalysts, and heterogeneous or supported catalysts, among others, and may be fed to the reactor as a liquid, slurry (liquid/solid mixture), or as a solid (typically gas transported). Liquid-form catalysts useful in embodiments disclosed herein should be stable and sprayable or atomizable. These catalysts may be used alone or in various combinations or mixtures. For example, one or more liquid catalysts, one or more solid catalysts, one or more supported catalysts, or a mixture of a liquid catalyst and/or a solid or supported catalyst, or a mixture of solid and supported catalysts may be used. These catalysts may be used with co-catalysts, activators, and/or promoters well known in the art. Examples of suitable catalysts include:

A. Ziegler-Natta catalysts, including titanium based catalysts, such as those described in U.S. Pat. Nos. 4,376,062 and 4,379,758. Ziegler-Natta catalysts are well known in the art, and typically are magnesium/titanium/electron donor complexes used in conjunction with an organoaluminum co-catalyst.

B. Chromium based catalysts, such as those described in U.S. Pat. Nos. 3,709,853; 3,709,954; and 4,077,904.

C. Vanadium based catalysts, such as vanadium oxychloride and vanadium acetylacetonate, such as described in U.S. Pat. No. 5,317,036.

D. Metallocene catalysts, such as those described in U.S. Pat. Nos. 6,933,258 and 6,894,131.

E. Cationic forms of metal halides, such as aluminum trihalides.

F. Cobalt catalysts and mixtures thereof, such as those described in U.S. Patent Nos. 4,472,559 and 4,182,814.

G. Nickel catalysts and mixtures thereof, such as those described in U.S. Pat. Nos. 4,155,880 and 4,102,817.

H. Rare Earth metal catalysts, i.e., those containing a metal having an atomic number in the Periodic Table of 57 to 103, such as compounds of cerium, lanthanum, praseodymium, gadolinium and neodymium. Especially useful are carboxylates, alcoholates, acetylacetonates, halides (including ether and alcohol complexes of neodymium trichloride), and allyl derivatives of such metals. In various embodiments, neodymium compounds, particularly neodymium neodecanoate, octanoate, and versatate, are particularly useful rare earth metal catalysts. Rare earth catalysts may be used, for example, to polymerize butadiene or isoprene.

I. Group 15 atom and metal containing catalysts described in, for example, EP 0 893 454 A1, U.S. Pat. No. 5,889,128 and the references cited in U.S. Pat. No. 5,889,128.

J. Any combination of the above to form a mixed catalyst system.

The above described catalyst compounds, activators and/or catalyst systems, as noted above, may also be combined with one or more support materials or carriers. For example, in some embodiments, the activator is contacted with a support to form a supported activator wherein the activator is deposited on, contacted with, vaporized with, bonded to, or incorporated within, adsorbed or absorbed in, or on, a support or carrier.

Support materials may include inorganic or organic support materials, such as a porous support material. Non-limiting examples of inorganic support materials include inorganic oxides and inorganic chlorides. Other carriers include resinous support materials such as polystyrene, functionalized or crosslinked organic supports, such as polystyrene divinyl benzene, polyolefins or polymeric compounds, or any other organic or inorganic support material and the like, or mixtures thereof.

The support materials may include inorganic oxides including Group 2, 3, 4, 5, 13 or 14 metal oxides, such as silica, fumed silica, alumina, silica-alumina and mixtures thereof. Other useful supports include magnesia, titania, zirconia, magnesium chloride, montmorillonite, phyllosilicate, zeolites, talc, clays, and the like. Also, combinations of these support materials may be used, for example, silica-chromium, silica-alumina, silica-titania and the like. Additional support materials may include those porous acrylic polymers described in EP 0 767 184. Other support materials include nanocomposites, as described in PCT WO 99/47598, aerogels, as described in WO 99/48605, spherulites, as described in U.S. Pat. No. 5,972,510, and polymeric beads, as described in WO 99/50311.

Support material, such as inorganic oxides, may have a surface area in the range from about 10 to about 700 $m^2/g$, a pore volume in the range from about 0.1 to about 4 cc/g, and an average particle size in the range from about 5 to about 1000 µm. In other embodiments, the surface area of the support may be in the range from about 50 to about 500 $m^2/g$, the pore volume is from about 0.5 to about 3.5 cc/g, and the average particle size is from about 10 to about 500 µm. In yet other embodiments, the surface area of the support is in the range from about 100 to about 1000 $m^2/g$, the pore volume is from about 0.8 to about 5.0 cc/g, and the average particle size is from about 5 to about 200 µm. The average pore size of the support material in some embodiments disclosed herein is in the range from 10 to 1000 Å; from about 50 to about 500 Å in other embodiments; and from about 75 to about 450 Å in yet other embodiments.

There are various methods known in the art for producing a supported activator or combining an activator with a support material. In an embodiment, the support material is chemically treated and/or dehydrated prior to combining with the catalyst compound, activator and/or catalyst system. In a family of embodiments, the support material may have various levels of dehydration, such as may be achieved by drying the support material at temperatures in the range from about 200° C. to about 1000° C.

In some embodiments, dehydrated silica may be contacted with an organoaluminum or alumoxane compound. In specifically the embodiment wherein an organoaluminum compound is used, the activator is formed in situ in the support material as a result of the reaction of, for example, trimethylaluminum and water.

In yet other embodiments, Lewis base-containing support substrates will react with a Lewis acidic activator to form a support bonded Lewis acid compound. The Lewis base hydroxyl groups of silica are exemplary of metal/metalloid oxides where this method of bonding to a support occurs. These embodiments are described in, for example, U.S. Pat. No. 6,147,173.

Other embodiments of supporting an activator are described in U.S. Pat. No. 5,427,991, where supported non-coordinating anions derived from trisperfluorophenyl boron are described; U.S. Pat. No. 5,643,847, discusses the reaction of Group 13 Lewis acid compounds with metal oxides such as silica and illustrates the reaction of trisperfluorophenyl boron with silanol groups (the hydroxyl groups of silicon) resulting in bound anions capable of protonating transition metal organometallic catalyst compounds to form catalytically active cations counter-balanced by the bound anions; immobilized Group IIIA Lewis acid catalysts suitable for carbocationic polymerizations are described in U.S. Pat. No. 5,288,677; and James C. W. Chien, Jour. Poly. Sci.: Pt A: Poly. Chem, Vol. 29, 1603-1607 (1991), describes the olefin polymerization utility of methylalumoxane (MAO) reacted with silica ($SiO_2$) and metallocenes and describes a covalent bonding of the aluminum atom to the silica through an oxygen atom in the surface hydroxyl groups of the silica.

In some embodiments, the supported activator is formed by preparing, in an agitated, temperature and pressure controlled vessel, a solution of the activator and a suitable solvent, then adding the support material at temperatures from 0° C. to 100° C., contacting the support with the activator solution for up to 24 hours, then using a combination of heat and pressure to remove the solvent to produce a free flowing powder. Temperatures can range from 40 to 120° C. and pressures from 5 psia to 20 psia (34.5 to 138 kPa). An inert gas sweep can also be used in assist in removing solvent. Alternate orders of addition, such as slurrying the support material in an appropriate solvent then adding the activator, can be used.

In an embodiment, the weight percent of the activator to the support material is in the range from about 10 weight percent to about 70 weight percent, in the range from about 20 weight percent to about 60 weight percent in other embodiments, in the range from about 30 weight percent to about 50 weight percent in other embodiments, and in the range from about 30 weight percent to about 40 weight percent in yet other embodiments.

Conventional supported catalysts system useful in embodiments disclosed herein include those supported catalyst systems that are formed by contacting a support material, an activator and a catalyst compound in various ways under a variety of conditions outside of a catalyst feeder apparatus. Examples of conventional methods of supporting metallocene catalyst systems are described in U.S. Pat. Nos. 4,701,432, 4,808,561, 4,912,075, 4,925,821, 4,937,217, 5,008,228, 5,238,892, 5,240,894, 5,332,706, 5,346,925, 5,422,325, 5,466,649, 5,466,766, 5,468,702, 5,529,965, 5,554,704, 5,629,253, 5,639,835, 5,625,015, 5,643,847, 5,665,665, 5,698,487, 5,714,424, 5,723,400, 5,723,402, 5,731,261, 5,759,940, 5,767,032, 5,770,664, 5,846,895, 5,939,348, 546, 872, 6,090,740 and PCT publications WO 95/32995, WO 95/14044, WO 96/06187 and WO 97/02297, and EP-B1-0 685 494.

The catalyst components, for example a catalyst compound, activator and support, may be fed into the polymerization reactor as a mineral oil slurry. Solids concentrations in oil may range from about 3 to about 30 weight percent in some embodiments; and from about 10 to about 25 weight percent in other embodiments.

The catalyst compounds, activators and or optional supports used herein may also be spray dried separately or together prior to being injected into the reactor. The spray dried catalyst may be used as a powder or solid or may be placed in a diluent and slurried into the reactor. In other embodiments, the catalyst compounds and activators used herein are not supported.

Processes disclosed herein may optionally use inert particulate materials as fluidization aids. These inert particulate materials can include carbon black, silica, talc, and clays, as well as inert polymeric materials. Carbon black, for example, has a primary particle size of about 10 to about 100 nanometers, an average size of aggregate of about 0.1 to about 30 microns, and a specific surface area from about 30 to about 1500 $m^2/g$. Silica has a primary particle size of about 5 to about 50 nanometers, an average size of aggregate of about 0.1 to about 30 microns, and a specific surface area from about 50 to about 500 $m^2/g$. Clay, talc, and polymeric materials have an average particle size of about 0.01 to about 10 microns and a specific surface area of about 3 to 30 $m^2/g$. These inert particulate materials may be used in amounts ranging from about 0.3 to about 80% in some embodiments, and from about 5 to about 50% in other embodiments, based on the weight of the final product. They are especially useful for the polymerization of sticky polymers as disclosed in U.S. Pat. Nos. 4,994,534 and 5,304,588.

Chain transfer agents, promoters, scavenging agents and other additives may be, and often are, used in the polymerization processes disclosed herein. Chain transfer agents are often used to control polymer molecular weight. Examples of these compounds are hydrogen and metal alkyls of the general formula $M^xR_y$, where M is a Group 3-12 metal, x is the oxidation state of the metal, typically 1, 2, 3, 4, 5 or 6, each R is independently an alkyl or aryl, and y is 0, 1, 2, 3, 4, 5, or 6. In some embodiments, a zinc alkyl is used, such as diethyl zinc. Typical promoters may include halogenated hydrocarbons such as $CHCl_3$, $CFCl_3$, $CH_3$—$CCl_3$, $CF_2Cl$—$CCl_3$, and ethyltrichloroacetate. Such promoters are well known to those skilled in the art and are disclosed in, for example, U.S. Pat. No. 4,988,783. Other organometallic compounds such as scavenging agents for poisons may also be used to increase catalyst activity. Examples of these compounds include metal alkyls, such as aluminum alkyls, for example, triisobutylaluminum. Some compounds may be used to neutralize static in the fluidized-bed reactor, others known as drivers rather than antistatic agents, may consistently force the static from positive to negative or from negative to positive. The use of these additives is well within the skill of those skilled in the art. These additives may be added to the circulation loops, riser, and/or downer separately or independently from the liquid catalyst if they are solids, or as part of the catalyst provided they do not interfere with the desired atomization. To be part of the catalyst solution, the additives should be liquids or capable of being dissolved in the catalyst solution.

As used herein, a static control agent is a chemical composition which, when introduced into a fluidized bed reactor, may influence or drive the static charge (negatively, positively, or to zero) in the fluidized bed. The specific static control agent used may depend upon the nature of the static charge, and the choice of static control agent may vary dependent upon the polymer being produced and the catalyst being used. For example, the use of static control agents is disclosed in European Patent No. 0229368 and U.S. Pat. No. 5,283,278 and references cited therein.

For example, if the static charge is negative, then static control agents such as positive charge generating compounds may be used. Positive charge generating compounds may include MgO, ZnO, $Al_2O_3$, and CuO, for example. In addition, alcohols, oxygen, and nitric oxide may also be used to control negative static charges. See, for example, U.S. Pat. Nos. 4,803,251 and 4,555,370.

For positive static charges, negative charge generating inorganic chemicals such as $V_2O_5$, $SiO_2$, $TiO_2$, and $Fe_2O_3$ may be used. In addition, water or ketones containing up to 7 carbon atoms may be used to reduce a positive charge.

In a class of embodiments, when catalysts such as, for example, metallocene catalysts, are used in the circulating fluidized bed reactors disclosed herein, control agents such as aluminum stearate may also be employed. The static control agent used may be selected for its ability to receive the static charge in the fluidized bed without adversely affecting productivity. Suitable static control agents may also include aluminum distearate, ethoxylated amines, and anti-static compositions such as those provided by Innospec Inc. under the trade name OCTASTAT 2000, a mixture of a polysulfone copolymer, polymeric polyamine, and oil-soluble sulfonic acid.

Any of the aforementioned control agents, as well as those described in, for example, WO 01/44322, listed under the heading Carboxylate Metal Salt and including those chemicals and compositions listed as antistatic agents may be employed either alone or in combination as a control agent. For example, the carboxylate metal salt may be combined with an amine containing control agent (e.g., a carboxylate metal salt with any family member belonging to the KEMAMINE (available from Crompton Corporation) or ATMER (available from ICI Americas Inc.) family of products).

Other static control agents useful in embodiments disclosed herein are well known to those in the art. Regardless of which agent is used, care should be exercised in selecting an appropriate static control agent to avoid introduction of poisons into the reactor. In addition, in selected embodiments, the smallest amount of the agent necessary to bring the static charge into alignment with the desired range should be used.

In some embodiments, the static control agent added to the reactor may be a combination of two or more of the above listed static control agents. In other embodiments, the static control agent(s) may be added to the reactor in the form of a solution or a slurry, and may be added to the reactor as an individual feed stream or may be combined with other feeds prior to addition to the reactor. For example, the static control agent may be combined with the catalyst or catalyst slurry prior to feeding the combined catalyst-static control agent mixture to the reactor.

In some embodiments, the static control agent may be added to the reactor in an amount ranging from 0.05 to 200 ppm, based on the weight of all feeds to the reactor, excluding recycle. In other embodiments, the static control agent may be added to the reactor in an amount ranging from 2 to 100 ppm; and from 4 to 50 ppm in yet other embodiments. In other embodiments, the static control agent may be added to the reactor in an amount of 4 ppm or greater, based on the weight of all feeds to the reactor, excluding recycle.

Embodiments of the processes disclosed herein may also be operated in a condensing mode, similar to those disclosed in U.S. Pat. Nos. 4,543,399, 4,588,790, 4,994,534, 5,352,749, 5,462,999, and 6,489,408, and U.S. Patent Application Publication No. 20050137364. Condensing mode processes may be used to achieve higher cooling capacities and, hence, higher reactor productivity. In addition to condensable fluids of the polymerization process itself, including monomer(s) and co-monomer(s), other condensable fluids inert to the polymerization may be introduced to induce a condensing mode operation, such as by the processes described in U.S. Pat. No. 5,436,304.

The condensing mode of operation in polymerization reactors according to embodiments disclosed herein may significantly increase the production rate or space time yield by providing extra heat-removal capacity through the evaporation of condensates in the cycle gas. Additional condensation is often promoted to extend the utility of condensed mode operation by adding an induced condensing agent ("ICA") into the reactor.

The amount of condensation of liquid in the circulating components in the riser and/or downer can be maintained at up to about 50 percent by weight, for example. This degree of condensation is achieved by maintaining the outlet temperature from the heat exchange so as to achieve the required degree of cooling below the dew point of the mixture. The condensing levels in the riser and downer can be adjusted and controlled independently. In some embodiments of the processes disclosed herein, the riser may be in condensing mode operation, and the downer may be not in the condensing mode operation. In other embodiment, the downer may be operating in condensing mode while the riser is not. In other embodiments, neither or both may be in the condensing mode. Additionally, the riser and downer may be operated with the same or different levels of condensing.

In general, it would be desirable to have a high proportion of the induced condensing agent in the gaseous stream, to enhance the heat-removal from the reactor. Within the polymer particles, there is dissolved ICA, comonomer(s), other hydrocarbon(s), and even monomer(s), with quantities depending on the types those species and the gas composition. Usually the amount of ICA in the circulating stream is one of the most important factors that affect the overall quantity of the dissolved species in the polymer. At certain levels of ICA, an excess amount of the ICA is dissolved into the polymer particles, making the polymer sticky. Therefore, the amount of the ICA that can be introduced into the reactor, must be kept below the "stickiness limit" beyond which the circulating material becomes too sticky to discharge or to maintain the desired fluidization state. Each ICA has a different solubility in each specific polymer product, and in general, it is desirable to utilize an ICA having relatively low solubility in the produced polymer, so that more of the ICA can be utilized in the gaseous stream before reaching the stickiness limit. Because of the high drag force in the circulating fluidized bed polymerization reactor, the "stickiness limit" is usually higher or much higher than that in the traditional gas-phase polymerization reactors. For certain polymer products and certain ICAs, such a "stickiness limit" may not exist at all.

Suitable ICAs are materials having a low normal boiling point and/or a low solubility in polymers, for example with a normal boiling point less than 25° C. in some embodiments; less than 20° C. in other embodiments; less than 15° C. in other embodiments; less than 10° C. in other embodiments; and less than 0° C. in yet other embodiments.

Suitable ICAs include those having a "typical solubility" less than 1.5. In other embodiment, suitable ICAs include those having a typical solubility less than 1.25, less than 1.0 in other embodiments; less than 0.8 in other embodiments; less than 0.5 in other embodiments; and less than 0.3 in yet other embodiments. "Typical solubility" is determined under 90° C. reactor temperature and ICA partial pressure of 25 psi ($1.72 \times 10^5$ Pa), for polyethylene with melt index=1.0 dg/min and resin density=918 kg/m$^3$. In these embodiments, the melt index is determined using ASTM D1238.

In some embodiments, suitable ICAs include cyclobutane, neopentane, n-butane, isobutane, cyclopropane, propane, and mixtures thereof. It is recognized within the scope of embodiments disclosed herein that relatively volatile solvents such as propane, butane, isobutane or even isopentane can be matched against a heavier solvent or condensing agent such as isopentane, hexane, hexene, or heptane so that the volatility of the solvent is not so appreciably diminished in the circulation loops. Conversely, heavier solvents may also be used either to increase resin agglomeration or to control resin particle size.

In some embodiments of the processes disclosed herein, catalyst, monomer, comonomer, inert, chain transfer agent, condensing agents, solvents, and other compounds discussed above may be added, individually or in various combinations, directly to the riser and/or downer.

Hydrogen gas is often used in olefin polymerizations according to embodiments disclosed herein to control the final properties of the polyolefin. Using the catalyst systems described above, it is known that increasing the concentration (partial pressure) of hydrogen may increase the melt flow index (MFI) and/or melt index (MI) of the polyolefin generated. The MFI or MI can thus be influenced by the hydrogen concentration. The amount of hydrogen in the polymerization can be expressed as a mole ratio relative to the total polymerizable monomer, for example, ethylene, or a blend of ethylene and hexene or propylene. The amount of hydrogen used in the polymerization processes of embodiments disclosed herein is an amount necessary to achieve the desired MFI or MI of the final polyolefin resin.

The riser and downer of the polymerization processes disclosed herein may be operated over a wide range of temperatures and pressures. The riser and downer of the polymerization processes disclosed herein may be operated at temperatures in the range from −60° C. to about 280° C. in some embodiments; from 50° C. to about 200° C. in other embodiments. In other embodiments, the riser and/or downer may have a temperature ranging from about 10° C. to about 150° C.; and in another embodiment from about 40° C. to about 125° C. In one embodiment, the temperature in the riser and/or downer may be operated at the highest feasible temperature taking into account the sintering temperature of the polymer within the reactor and the strong drag force (which helps to fight polymer agglomeration and reactor wall fouling) of the process gas in the riser and the downer.

The pressures used may be in the range from about 1 atmosphere to about 500 atmospheres or higher. In one embodiment, the riser and downer regions of the reactor may be operated at pressures ranging from about 0.7 to about 70 bar (about 10 to 1000 psia); and in another embodiment a pressure ranging from about 14 to about 42 bar (about 200 to about 600 psia).

The flow rate of the gas through the riser and downer in the reactors described herein, as mentioned above, is selected to result in operation of the riser and downer in the fast fluidized flow regime or the dilute phase pneumatic conveying regimes. The superficial gas velocity in the riser and downer may vary from point to point, as based on temperature, condensation, and the location of various feeds, such as hydrogen, monomer, and comonomer feeds, among other variables. Regardless, the lowest superficial gas velocity in any section of the riser and downer should be greater than the flow-regime transition velocity to the fast fluidization. In this manner, settling or lack of circulation of large particles within one leg of the reactor can be avoided, and the reactor is operating in the desired dilute-phase regime (i.e., either fast fluidization or pneumatic convey). The superficial gas velocity in the riser and downer of the polymerization reactors disclosed herein may be greater than about 1.1 meters per second, for example. In some embodiments, such as where operation in the fast fluidized flow regime is desired, superficial gas velocities may range from about 1.5 meters per second to about 3 meters per second. In other embodiments, such as where operation in the dilute phase pneumatic conveying regime is desired, superficial gas velocities greater than 3 meters per second, or even greater than 6 meters per second may be used. The flow regime may also depend on the particle size, particle size distribution, gas density, pressure, gas viscosity and granular particle density within the riser and downer, and the above values are given as a general reference, where one skilled in the art can readily determine the necessary superficial gas velocities required to operate in the desired flow regime.

Figure 4:
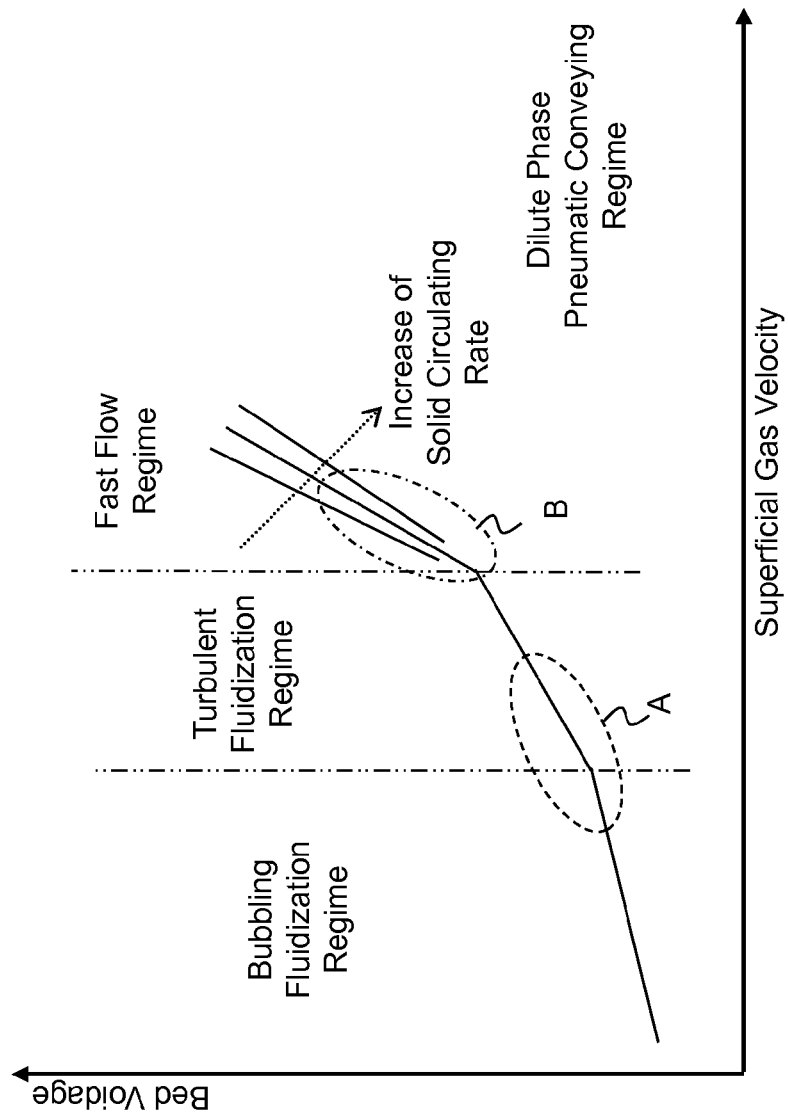
FIG. 4 is a graphical representation of the operating regimes of embodiments disclosed herein as compared to a traditional gas-phase fluidized bed reactor.

Referring now to FIG. 4, the operating regimes of embodiments disclosed herein as compared to a typical gas-phase fluidized bed reactor are illustrated. Bed voidage generally increases as the superficial gas velocity is increased. In the bubbling fluidization regime, transport of gas through a bed of particles results in a uniform distribution of bubbles over the bed; in the turbulent fluidization regime, more violent movement of the bed particles are observed with less recognizable bed level and irregular shapes of the bed voids; in the fast fluidization regime, the continuation phase in the reactor has been changed from the dense particle-gas emulsion to gas, particles form "clusters" in the bed, and the particle bed can not be maintained without the sufficient recycling of entrained particles; in the dilute phase pneumatic conveying regime, the particles move individually in the gas without any backmixing, typically with a lower concentration of solids than that in the fast fluidization regime. A typical "traditional" gas-phase polymerization reactor is operated in the bubble fluidization regime or in the lower portion of the turbulent fluidization regime, as illustrated by the region encompassed by the Circle A. For reactors disclosed herein, the riser and downer are operated at greater superficial gas velocities than typical gas phase reactors, typically at gas velocities greater than that dividing the turbulent fluidization regime and fast fluidization regime, as represented by the Circle B.

There are no bubbles in the riser and downer; all the particles are carried through the riser and downer by high-velocity gas and both solid and gas may be closer to plug-flow in each pass through the riser and downer, compared to the flow pattern in the "traditional" gas-phase fluidized bed reactors. One possible exception is that the gas-solid separators or the product separator might be operated in a relatively dense condition of fluidization. The residence times of gas and solid in the riser and downer is relatively short, where the growing entrained particles typically recycle many times through both the riser and downer. As a result, the overall performance of the circulating fluidized bed reactor is similar to a CSTR (Continuous Stirred Tank Reactor) or series of CSTRs for the solid phase.

The circulating fluidized bed reactors according to embodiments disclosed herein allow a wide platitude of products to be made. For example, the risers and downers may be operated using the same or different circulating gas compositions, reaction temperatures, reaction pressures, etc., allowing for the production of resins having a unimodal molecular weight distribution, bimodal molecular weight distribution, narrow molecular weight distribution, broad molecular weight distribution, etc.

In some embodiments, one or more olefins, including ethylene or propylene or combinations thereof, may be prepolymerized in the presence of the catalyst systems described above prior to the main polymerization within the reactors described herein. The prepolymerization may be carried out batch-wise or continuously in gas, solution, or slurry phase, including at elevated pressures. The prepolymerization can take place with any olefin monomer or combination and/or in the presence of any molecular weight controlling agent such as hydrogen. For examples of prepolymerization procedures, see U.S. Pat. Nos. 4,748,221, 4,789,359, 4,923,833, 4,921, 825, 5,283,278 and 5,705,578 and European publication EP-B-0279 863 and WO 97/44371.

In a family of embodiments, the reactors disclosed herein are capable of producing greater than 500 lbs of polymer per hour (227 Kg/hr) to about 220,000 lbs/hr (100,000 kg/hr) or higher of polymer, preferably greater than 1000 lbs/hr (455 kg/hr), more preferably greater than 10,000 lbs/hr (4540 kg/hr), even more preferably greater than 25,000 lbs/hr (11,300 kg/hr), still more preferably greater than 35,000 lbs/hr (15,900 kg/hr), still even more preferably greater than 50,000 lbs/hr (22,700 Kg/hr) and most preferably greater than 65,000 lbs/hr (29,000 kg/hr) to greater than 100,000 lbs/hr (45,500 kg/hr).

The polymers produced by the processes described herein can be used in a wide variety of products and end-use applications. The polymers produced may include linear low density polyethylene, elastomers, plastomers, high density polyethylenes, medium density polyethylenes, low density polyethylenes, polypropylene homopolymers and polypropylene copolymers, including random copolymers and impact copolymers.

The polymers, typically ethylene based polymers, have a density in the range of from 0.86 g/cc to 0.97 g/cc, preferably in the range of from 0.88 g/cc to 0.965 g/cc, more preferably in the range of from 0.900 g/cc to 0.96 g/cc, even more preferably in the range of from 0.905 g/cc to 0.95 g/cc, yet even more preferably in the range from 0.910 g/cc to 0.940 g/cc, and most preferably greater than 0.915 g/cc, preferably greater than 0.920 g/cc, and most preferably greater than 0.925 g/cc. Density is measured in accordance with ASTM-D-1238.

In yet another embodiment, propylene based polymers are produced according to embodiments disclosed herein. These polymers include atactic polypropylene, isotactic polypropylene, hemi-isotactic and syndiotactic polypropylene. Other propylene polymers include propylene block, random, or impact copolymers. Propylene polymers of these types are well known in the art, see for example U.S. Pat. Nos. 4,794,096, 3,248,455, 4,376,851, 5,036,034 and 5,459,117, all of which are herein incorporated by reference.

The polymers may be blended and/or coextruded with any other polymer. Non-limiting examples of other polymers include linear low density polyethylenes produced via conventional Ziegler-Natta and/or metallocene catalysis, elastomers, plastomers, high pressure low density polyethylene, high density polyethylenes, polypropylenes, and the like.

Polymers produced by the processes disclosed herein and blends thereof are useful in such forming operations as film, sheet, and fiber extrusion and co-extrusion as well as blow molding, injection molding and rotary molding. Films include blown or cast films formed by co-extrusion or by lamination useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications. Fibers include melt spinning, solution spinning and melt blown fiber operations for use in woven or non-woven form to make filters, diaper fabrics, medical garments, geotextiles, etc. Extruded articles include medical tubing, wire and cable coatings, pipe, geomembranes, and pond liners. Molded articles include single and multi-layered constructions in the form of bottles, tanks, large hollow articles, rigid food containers and toys, etc.

It is also contemplated that various embodiments may be practiced utilizing two or more circulating fluidized bed reactors as described herein or use of a circulating fluidized bed reactor as described herein in series or parallel with a traditional gas phase reactor, a slurry polymerization reactor, or both.

EXAMPLES

It is to be understood that while the invention has been described in conjunction with the specific embodiments thereof, the foregoing description is intended to illustrate and not limit the scope of the invention. Other aspects, advantages and modifications will be apparent to those skilled in the art to which the invention pertains.

Therefore, the following examples are put forth so as to provide those skilled in the art with a complete disclosure and description and are not intended to limit the scope of that which the inventors regard as their invention.

Example 1

Production of Bi-Modal Polyethylene

A process similar to that illustrated in FIG. 1 is operated under continuous conditions to produce polyethylene with a bi-modal molecular weight distribution and select properties. The production rate of polymer product is about 600 kg per hour. The diameters of the riser and downer are each about 0.406 m. A Ziegler-Natta catalyst, prepared using the procedure disclosed in U.S. Pat. No. 5,047,468, is employed as the polymerization catalyst. In the riser, a relatively low-molecular weight component of ethylene-butene copolymer is made, while a relatively high-molecular weight ethylene-butene copolymer component is made in the downer. The final product has very uniform polymer property distribution within each granular product particle, with the contribution of the high- and low-molecular weight copolymer components. Product properties, and operating conditions of the riser and downer, are given in Table 1.

TABLE 1

|  | Riser | Downer |
|---|---|---|
| Pressure (MPa-gauge) | 2.1 | 2.1 |
| Temperature (° C.) | 86 | 86 |
| Comonomer | 1-butene | 1-butene |
| Hydrogen/ethylene mole ratio | 1.21 | 0.151 |
| Comonomer/ethylene mole ratio | 0.319 | 0.378 |
| Ethylene partial pressure (MPa) | 0.565 | 0.985 |
| Nitrogen mole % in gas | 33% | 29% |
| Relative quantity of polymer made by weight | 62% | 38% |
| Gas velocity (m/s) | 2.5 | 1.8 |

The final product, with a broad, bimodal molecular weight distribution, has a density of 0.925 g/cc, a melt index of 3.9 g/10 min., and a melt flow ratio of 35. Polymer density is measured in accordance with ASTM-D-1238. Polymer Melt Index and Flow Index are measured in accordance with ASTM-D-1505 Condition E and Condition F, respectively. Melt Flow Ratio is the ratio of the Flow Index to the Melt Index.

Example 2

Production of Impact Polypropylene Copolymer

A process similar to that illustrated in FIG. 1 is operated under continuous conditions to produce an impact polypropylene copolymer product. The production rate of polymer product is about 600 kg per hour. The diameters of the riser and downer are each about 0.406 m. A polymerization catalyst, prepared using the procedure detailed in U.S. Pat. No. 4,882,380, is employed. In the riser, a component of propylene-dominate propylene-ethylene copolymer is made, while an ethylene-dominate ethylene-propylene copolymer component is made in the downer. The final product, called impact propylene copolymer, has a very uniform polymer property distribution within each granular product particle, with the contribution of the two copolymer components. Product properties, and operating conditions of the riser and downer are given in Table 2.

TABLE 2

|  | Riser | Downer |
| --- | --- | --- |
| Pressure (MPa-gauge) | 2.6 | 2.6 |
| Temperature (° C.) | 65 | 70 |
| Hydrogen/(propylene + ethylene) mole ratio | 0.059 | 0.17 |
| Ethylene/propylene ratio | 0.024 | 14 |
| Gas velocity (m/s) | 2.3 | 1.6 |
| Relative quantity of polymer made by weight | 77% | 23% |

The final product has a Melt Flow (measured via ASTM-D-1238) of 3.2 g/10 min., a secant modulus (measured via ASTM-D-790, Method A) of 0.0944 Pa, a tensile yield strength (measured via ASTM-D-638, draw rate=2 inches per minute) of 29.6 MPa, a tensile yield elongation (measured via ASTM-D-638, draw rate=2 inches per minute) of 10.1%, and a Vicat softening point (measured via ASTM-D-1525) of 132° C.

The above-described circulating fluidized bed reactor may result in improved polymerization operations. Two gas circulation loops, allowing for operation of the riser and downer in the dilute-phase fluidization regimes with high drag force, may advantageously allow for production of mixed polymer products without fear of agglomeration and fouling, as may be encountered frequently in a reactor system including a dense-phase downcorner, where polymer particles may form a dense bed incapable of efficient heat removal.

The increased superficial gas velocity through the riser and downer results in improved heat and mass transfer and also results in higher shear forces than in conventional bubbling fluidization, each of which may contribute to reduced agglomeration of particles. The high gas velocity and resulting drag force on the polymer particles may additionally result in a decrease of wall fouling, both in the riser and downer portions of the reactor.

Additionally, a majority of the product removed from the reactors disclosed herein will be mature particles, and may include less fines than is typically removed from a traditional gas-phase reactor where circulation/entrainment of particles is not desired. The decrease in fines in the polymer product may result in a uniform product particle size, which may, in turn, result in product improvements (such as improved compounding/mixing, decreased gels, etc. that may result from a uniform product). The uniform product recovered from the reactor may also be a result of reduced bypass of fresh catalyst particles; because the newly added catalyst particles would typically be segregated and recirculated, the fresh catalyst is less likely to be discharged with the product, resulting in enhanced catalyst performance (activity, yield, etc.).

Circulating fluidized bed reactors as disclosed herein may also result in improved startup and transitions as compared to traditional gas-phase reactors. For example, startup times may be reduced as a result of low bed inventory operation without worrying about sheeting and agglomeration. With respect to transitions, due to the ability to control reactor inventory, and little or no sheeting and agglomeration in the reactor, transitions with such a circulating fluidized bed reactor may result in decreased off-grade material.

The phrases, unless otherwise specified, "consists essentially of and "consisting essentially of do not exclude the presence of other steps, elements, or materials, whether or not, specifically mentioned in this specification, so long as such steps, elements, or materials, do not affect the basic and novel characteristics of the invention, additionally, they do not exclude impurities and variances normally associated with the elements and materials used.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All priority documents are herein fully incorporated by reference for all jurisdictions in which such incorporation is permitted and to the extent such disclosure is consistent with the description of the present invention. Further, all documents and references cited herein, including testing procedures, publications, patents, journal articles, etc. are herein fully incorporated by reference for all jurisdictions in which such incorporation is permitted and to the extent such disclosure is consistent with the description of the present invention.

While the invention has been described with respect to a number of embodiments and examples, those skilled in the art, having benefit of this disclosure, will appreciate that other embodiments can be devised which do not depart from the scope and spirit of the invention as disclosed herein.

What is claimed is:

1. A continuous gas phase circulating bed olefin polymerization reactor, comprising:
    a riser for contacting a catalyst and a first gas composition comprising an olefin to form a polyolefin under fast-fluidization regime or a dilute-phase pneumatic conveying regime conditions;
    a downer for contacting the catalyst and a second gas composition comprising an olefin to form additional polyolefin under fast fluidization regime or a dilute-phase pneumatic conveying regime conditions; and
    a transport section for conveying at least a portion of the catalyst, polyolefin, and additional polyolefin from the downer to the riser;
    a first gas circulation loop for circulating the first gas composition from an outlet of the riser to an inlet of the riser;
    a device for circulating the first gas composition through the riser and the first circulation loop;
    a second gas circulation loop for circulating the second gas composition from an outlet of the downer to an inlet of the downer;
    a device for circulating the second gas composition through the downer and the second circulation loop; and
    a device for discharging polymer product from the reactor system that comprises a fluidization/settling chamber for segregating the polymer product from the particles circulating through the riser and downer.

2. The reactor of claim 1, further comprising at least one heat exchange device to remove heat via indirect heat exchange with at least one of the riser, the first circulation loop, the downer, and the second circulation loop.

3. The reactor of claim 1, further comprising a first gas-solids separator for separating the first gas composition from the catalyst and polyolefin.

4. The reactor of claim 3, wherein the first gas-solids separator comprises at least one of an inertial separator, a settling chamber, a baffle chamber, and combinations thereof.

5. The reactor of claim 3, further comprising a fluid conduit for feeding at least a portion of the catalyst and polyolefin from the first gas-solids separator to the downer.

6. The reactor of claim 5, further comprising a second gas-solids separator for separating the second gas composition from the catalyst, polyolefin, and additional polyolefin.

7. The reactor of claim 1, wherein the device for discharging polymer product from the reactor system discharges a polymer product having an average particle size greater than an average particle size of particles circulating through the riser and the downer.

8. The reactor of claim 1, further comprising one or more fluid conduits for introducing at least one of a polymerization catalyst, one or more olefins, co-catalyst, an activator, an antistatic agent, an induced condensing agent, hydrogen, a comonomer, and a dilution gas to at least one of the riser, the downer, the first circulation loop, and the second circulation loop.

9. A process for the polymerization of olefins, comprising:
 contacting in a riser a catalyst and a first gas composition comprising an olefin to form a polyolefin, wherein the contacting in the riser is under fast fluidization regime or dilute-phase pneumatic conveying regime conditions;
 contacting in a downer the catalyst and a second gas composition comprising an olefin to form additional polyolefin, wherein the contacting in the downer is under fast fluidization regime or dilute-phase pneumatic conveying regime conditions;
 conveying at least a portion of the catalyst, polyolefin, and additional polyolefin from the downer to the riser; and
 discharging polymer product particles from the reactor system having an average particle size greater than an average particle size of particles circulating through the riser and the downer.

10. The process of claim 9, further comprising circulating the first gas composition via a first circulation loop from an outlet of the riser to an inlet of the riser.

11. The process of claim 10, further comprising circulating the second gas composition via a second gas circulation loop from an outlet of the downer to an inlet of the downer.

12. The process of claim 11, further comprising removing heat via indirect heat exchange with at least one of the riser, first circulation loop, downer, and the second circulation loop.

13. The process of claim 9, further comprising separating the first gas composition from the catalyst and polyolefin.

14. The process of claim 13, further comprising feeding at least a portion of the catalyst and polyolefin from the first gas-solids separator to the downer.

15. The process of claim 14, further comprising separating the second gas composition from the catalyst, polyolefin, and additional polyolefin.

16. The process of claim 9, wherein the discharging comprises contacting polyolefin particles from the downer with a gas flowing at a gas velocity greater than a terminal velocity of at least a portion of the polyolefin particles and less than a terminal velocity of the polymer product particles.

17. The process of claim 11, further comprising introducing at least one of a polymerization catalyst, one or more olefins, co-catalyst, an activator, an antistatic agent, an induced condensing agent, hydrogen, a comonomer, and a dilution gas to at least one of the riser, the downer, the first circulation loop, and the second circulation loop.

18. The process of claim 9, comprising operating at least one of the riser and the downer in the condensed mode.

19. The process of claim 9, wherein the polymer product particles comprise polymer produced in each of the riser and the downer mixed at the intra-particle level.

* * * * *